Figure 1:
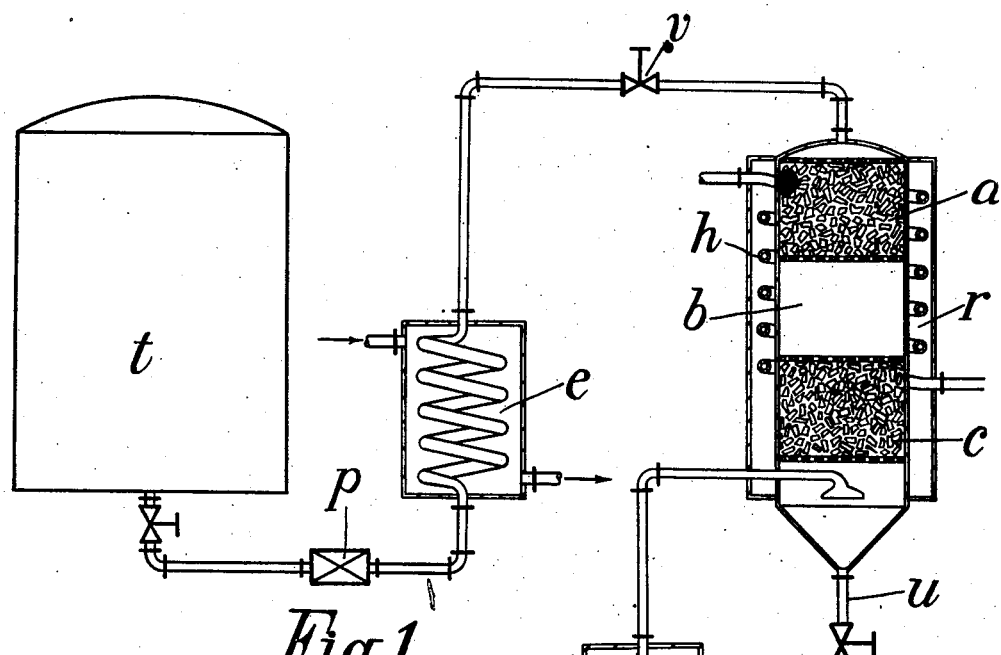

Oct. 25, 1938.                K. SÜSSELBECK                2,134,241
      PROCESS FOR PURIFYING CRUDE HYDROCARBONS, MORE PARTICULARLY
            CRUDE BENZOLE, CRUDE BENZINE, AND CRACK BENZINE
                          Filed Aug. 11, 1936

Inventor:
K. Süsselbeck
By Glascock Downing & Seebold
        Attys.

Patented Oct. 25, 1938

2,134,241

UNITED STATES PATENT OFFICE 2,134,241

PROCESS FOR PURIFYING CRUDE HYDROCARBONS, MORE PARTICULARLY CRUDE BENZOLE, CRUDE BENZINE, AND CRACK BENZINE

Karl Süsselbeck, Oberhausen-Sterkrade, Germany, assignor to Gutehoffnungshütte Oberhausen Aktiengesellschaft, Oberhausen-Rheinland, Germany Application August 11, 1936, Serial No. 95,466
In Germany March 11, 1935

7 Claims. (Cl. 196—36)

The known processes for purifying crude or raw hydrocarbons with diluted sulphuric acid or silica gel certainly enable the partly harmful unsaturated hyrdocarbons (diolefines) and in addition the free and organic sulphur compounds to be removed, but several separate working operations were necessary for this purpose as well as the indirect or direct employment of sulphuric acid. As the examination of the purified products showed, substantial portions of unsaturated hydrocarbons were destroyed by the purification process.

According to the present invention these drawbacks and circumstances are avoided. First of all the basic impurities are removed with diluted sulphuric acid (about 30% sulphuric acid) and the pyridine acid residues remaining after this washing removed with dilute caustic soda, and then, according to the present invention, the crude hydrocarbons preliminarily treated thus, more particularly motor driving substances, e. g. crude benzole, crude benzine, benzine from cracking operations or the like, are led in the vapour state through carbolic acid or its homologues, more particularly cresol, and/or oil fractions containing tar acids from mineral coal tars, brown coal tars or low temperature distillation tars, alone or in admixture with other hydrocarbon oils. The said purifying or washing agents may be used alone or in admixture or stepwise after one another.

The purifying or washing agent, e. g. cresol, or a solution of cresol in heavy hydrocarbon oils, or the said tar acids, must be maintained at a higher temperature than corresponds to the boiling temperature of the crude hyrocarbon being purified in order to prevent a condensation of the hydrocarbon vapours in the purifying agent, but on the other hand the purifying or washing agent ought not to be heated above its boiling point so as to avoid its being drawn off with the hydrocarbon being purified. In order to be able to purify high boiling constituents as well, say hydrocarbons boiling above say 160° or 180° C., the purifying agent is applied to porous, if desired surface active, bodies or substances; preferably the said bodies or substances are impregnated or soaked therewith. As carrier substances may be used kieselguhr, bleaching earths, infusorial earth, pumice, wood charcoal, coke, silica gel, active charcoal, or the like substances, the surface of which is sufficiently large extensively to distribute the purifying agents. The mixing ratio of the purifying agent (e. g. tar acids, more particularly cresol) to the solid substance depends upon the hydrocarbon to be purified and the porosity of the solid substance. In order to apply the purifying agent to the porous substances as uniformly as possibly to the said agent is advantageously diluted with a light oil, benzine distillate or benzole distillate. As compared with the purification of crude benzine from cracking operations with bleaching earth alone, the process of the present invention has the advantage that the refined product has a low gum content and consequently possesses better storage stability.

For a boiling range, for example, as in the case of crude benzole, of about 80 to 150° C. the temperature of the purifying agent may be kept at about 100 to 120° C. at the commencement of the treatment and increased gradually up to the conclusion of the boiling of the hydrocarbon in question, in the case of benzole for example to about 170 to 180° C. This temperature always has to lie about 10 to 20° C. below the boiling point of the purifying agent in question. It is also possible however to carry out the washing of the hydrocarbon fuel forthwith at a temperature which is at the maximum. A gradual increase in the temperature is then dispensed with.

By means of this treatment of the crude hydrocarbons it is possible successfully extensively to remove the unsaturated constituents which tend to cause resinification (gum formation) without destroying the remaining non-resinforming (non-gum-forming) unsaturated hydrocarbons. The purifying agents probably have a polymerizing action on the diolefines and at the same time act as selective solvents. The consumption of purifying or washing agents is hardly worth consideration and is smaller than in the known processes. The purifying or washing agent remains repeatedly usable and furthermore, after it is spent, it can be regenerated and made usable again by simple distillation.

The manner in which the purifying process works, when using purifying agent in liquid phase, such as cresol for example, or a solution of cresol in heavy hydrocarbon oils, is somewhat as follows: The hydrocarbons leaving the still in vapour form, for example benzole vapours, are led through a plunge pipe with a sieve bottom and a steam-heated washer charged with the washing agent and preferably hollow filling bodies for raining the time of contact of the vapours with the washing agent, or through a pipe-like or drum-shaped stirring mechanism. The hydrocarbon vapours streaming from the washer or stirring mechanism are advantageously supplied to a condenser through a column with a dephlegmator.

When employing washing agents on solid supports the crude hydrocarbons can be purified stepwise from the retort or still or continuously from an intermediate container. Continuous purification affords the advantage that the whole of the hydrocarbons present are heated to the various boiling points without separation into fractions. On release from pressure after the heating these hydrocarbons are converted into vapour form, the lower boiling constituents taking up those of higher boiling point. The former therefore serve as carrier substances for the constituents of higher boiling point, which themselves would not be converted into vapour form at the temperature which may prevail. The treatment temperature can now be chosen the lower the greater the proportion of low-boiling constituents in the mixture. If such constituents are present to only a small extent in the product to be purified, then the mean boiling temperature can be lowered by addition of low-boiling constituents or of carrier gases, e. g. inert gases, propane, butane, and so forth. In this way further surety is obtained that withdrawal of the purifying agent with the vaporous hydrocarbons to be purified does not occur.

Figure 2:
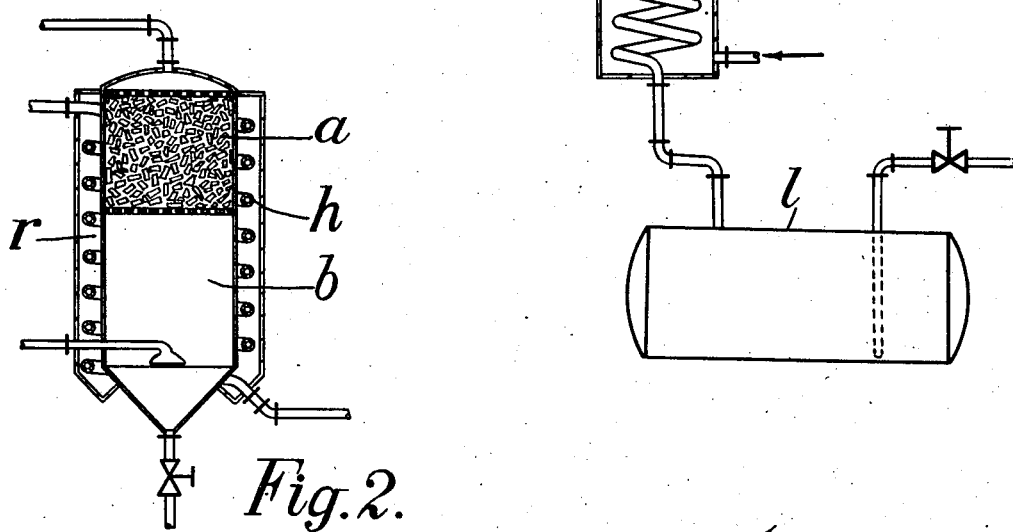

An example of a continuously operating plant employing porous bodies impregnated with purifying agent is shown in the accompanying drawing, where Figure 1 shows the whole plant, and
Figure 2 shows a modified form of the purifying vessel.

The crude hydrocarbons to be purified, e. g. crude benzene, benzine from cracking operations, crude benzole with constituents of higher boiling point, are led for example from the tank or intermediate container $t$ through the heater $e$ by means of a pump $p$ under a pressure such that after release from pressure behind the pressure reducing valve $v$ they flow through the purifying agent, applied to porous bodies, in the purifying vessel $r$. The vapours of the hydrocarbons to be purified enter the said vessel $r$ either at the top or at the bottom thereof and first of all traverse the porous bodies $a$ impregnated with the purifying agent. As a precautionary measure the vapours are then led by way of a free space $b$ through bodies $c$ which have not been impregnated with purifying agent, where they yield up purifying agent which, more particularly initially, may be carried along. The employment of a second layer $c$ as a precaution can however be dispensed with (Figure 2) insofar as the temperature, owing to the presence of a certain quantity of low-boiling constituents in the mixture, can be kept below an upper temperature limit depending on the nature of the purifying agent. The presence of the low-boiling constituents, as is well known, diminishes the boiling temperature in general, since these constituents, or added gases, serve as carriers for the high-boiling constituents.

The purified hydrocarbons leave the purifying vessel $r$ in vapour form, for which purpose heating means $h$ distributed as far as possible over the whole periphery of the vessel may be used with advantage, and, condensed to a liquid in the condenser $k$, are intercepted in a receiver or a collector $l$.

Residues which may form leave the purifying vessel at its lower end at $u$.

Motor fuels for internal combustion engines, e. g. motor benzole or motor benzine, benzine from cracking operations consisting of hydrocarbons, olefines and paraffins, purified in the manner provided by the invention are colourless, have a pleasant pure hydrocarbon odour, are free from resinifying substances (gum formers) and are characterized by a high bromine number indicating a high content of unsaturated hydrocarbons and consequently high anti-knock properties.

It is known to retard the resin formation of, for example, benzole by addition of traces of certain inhibitors, e. g. phenol, but such driving substances require a chemical pretreatment and after-treatment in order to improve the odour and colour and to remove the free sulphur compounds. The subject of the invention however consists, in contradistinction thereto, in removing the harmful constituents without destroying the valuable unsaturated hydrocarbons which improve the quality of the driving substances.

The following examples illustrate the process provided by this invention:—

*Example 1*

Analysis of the crude benzole: D/15°, 0.879
Boiling analysis:
 Beginning 78°
 up to 85, 90, 100, 110, 120, 141° C.
   25, 59, 80, 86, 90, 95 %
Active sulphur: 18 mg./100 ccm.
Analysis of the cresol: (Technical) D/22°, 1.034
Boiling analysis:
 Beginning 189°
 up to 195, 200, 204° C.
   3, 78, 95 %

Employed:
 About 6000 gs. of crude benzole
  150 gs. of cresol.

The crude benzole was preliminarily washed with 30% sulphuric acid and 10% causti csoda.

The benzole vapours issuing from the retort or still were led through a horizontal pipe-like stirring mechanism charged with cresol. The temperature of the cresol amounted at the commencement to 110° C. and after the first runnings and the benzole fraction had been distilled through was gradually increased to 175° C. A washer filled with Raschig rings and the cresol was used as reaction vessel.

Analysis of the purified benzole: D/15°, 0.878
Boiling analysis:
 Beginning 79°
 up to 85, 90, 100, 110, 118, 137° C.
   23, 57, 81, 88, 90, 95 %
Resin producer test: 3 mg/100 ccm.
Active sulphur: 0

After use 20 times and distillation 120 gs. of cresol, that is about 80% of the quantity of cresol added, were recovered with the boiling limits:

Boiling analysis:
 up to 190, 200, 209° C.
   1.5, 63, 94 %

The residue forms a thickly liquid brownish black grease.

| | Per cent by weight |
|---|---|
| Yield of motor benzole | 96.23 |
| Total washing and distillation losses | 1.45 |
| Still residue | 2.32 |
| | 100.00 |

Example 2

Analysis of the crude benzole: D/15°, 0.880
Preliminarily treated with diluted NaOH (10%) and diluted $H_2SO_4$ (30%)
Boiling analysis:
  Commencement 79°
  up to 80, 90, 100, 115, 120° C.
     8, 86, 92, 95, 98 %
Resin former test: 36 mg./100 ccm.
Active sulphur: 12 mg./100 ccm.
Analysis of the purifying agent (carbolic oil containing 40% phenols or tar acids and 60% neutral oil) D/15°, 1.0 boiling between 180° and 200°.
Procedure employed:
  10,000 ccm. crude benzole of the above kind,
  120 ccm. washing agent of the above composition.
The hydrocarbon vapours coming out of the column were brought together with the purifying agent in a washer, the temperature of the purifying agent amounted to 125° at first and later to 170° C., that is to say still below the boiling point of the purifying agent.
Analysis of the purified benzole: D/15°, 0.880
Boiling analysis:
  Commencement 78° C.
  up to 80, 90, 100, 115, 120° C.
     9, 83, 90, 92.5, 95%
Resin former test: 5 mg./100 ccm.
Active sulphur: Traces.

Example 3

Analysis of the crude benzole as in Example 2
Analysis of the purifying agent consisting of 70% Solvay oil (containing 10% tar acid) and 30% cresol in admixture.
Solvay oil: D/15°, 1.04 boiling between 220 to 300° C.
Cresol: D/15°, 1.03 boiling between 185 to 205° C.
Procedure and employment as in Example 2
  10,000 ccm. crude benzole and
  120 ccm. purifying agent.
As yield purified benzole was obtained as in Example 2, but with
Resin former test: 4 mg./100 ccm.
Active sulphur: 0.

Example 4

Analysis of the crude benzine from cracking operations: Density at 15° C.=0.687
Boiling analysis (Engler):

| | °C. |
|---|---|
| Beginning | 18.5 |
| 10 vol. per cent at | 39.5 |
| 20 vol. per cent at | 53.5 |
| 30 vol. per cent at | 67.0 |
| 40 vol. per cent at | 81.0 |
| 50 vol. per cent at | 93.0 |
| 60 vol. per cent at | 108.0 |
| 70 vol. per cent at | 121.0 |
| 80 vol. per cent at | 144.0 |
| 90 vol. per cent at | 151.0 |
| 96 vol. per cent at | 168.0 |

Oxidation test (glass dish): 123 mg/100 ccm.

Treatment: Prewashed with 10% NaOH for the purpose of removing organic acids, thereupon treated in the vapour phase with cresol.
Results of the refining operation:

| | | |
|---|---|---|
| Employed: | 3000 g. | |
| Yield of refined benzine | 2934 g.= | 97.80% |
| Still residue | 42 g.= | 1.40% |
| Total refining and distillation loss | 24 g.= | 0.80% |
| | 3000 g.= | 100.00% |

Analysis of the treated benzine: Density at 15° C.=0.686
Boiling analysis (Engler):

| | °C. |
|---|---|
| Beginning | 18 |
| 10 vol. per cent at | 38 |
| 20 vol. per cent at | 51 |
| 30 vol. per cent at | 65 |
| 40 vol. per cent at | 79 |
| 50 vol. per cent at | 90 |
| 60 vol. per cent at | 105 |
| 70 vol. per cent at | 119 |
| 80 vol. per cent at | 138 |
| 90 vol. per cent at | 147 |
| 96 vol. per cent at | 160 |

Oxidation test (glass dish): 8 mg/100 ccm.

Example 5

This example illustrates the discontinuous purification of synthetic benzine from cracking operations.
Analysis of the benzine from cracking operations:
  Density at 15° C.=0.744

| | | Degrees |
|---|---|---|
| Commencement of boiling | | 95 |
| 0.5 | volume per cent up to | 100 |
| 6 | volume per cent up to | 120 |
| 33 | volume per cent up to | 140 |
| 71 | volume per cent up to | 160 |
| 94 | volume per cent up to | 180 |
| 97.5 | volume per cent (dry point) up to | 189 |

Gum test: 68 mg./100 ccm. (copper dish).
This benzine was fractionally distilled. From 120° distillation was effected through kieselguhr impregnated with cresol (10%). The total distillate yielded on boiling analysis up to 180°=96° boiling constituents.
Analysis of the refined product: Density at 15° C.=0.742

| | Degrees |
|---|---|
| Commencement of boiling | 92 |
| 1 vol. per cent up to | 100 |
| 9 vol. per cent up to | 120 |
| 37 vol. per cent up to | 140 |
| 74 vol. per cent up to | 160 |
| 96 vol. per cent up to | 180 |
| 97 vol. per cent up to | 184 |

Gum test: 4 mg./100 ccm. (copper dish)
Refined product: Cresol-free.

Example 6

This example illustrates the continuous purification of the synthetic benzine from cracking operations of Example 5.
The analysis of the crude benzine was as in Example 5.
The benzine was led under a slight pressure through a superheater heated to 250-270° and the vapours sent through a heated neutral bleaching earth impregnated with cresol.
In spite of the fact that 95 vol. per cent constituents distilled from the end product up to 185° the cresol content was zero.

The evaporation test (copper dish) yielded 3 mg. of gum/100 ccm. The analysis of the refined product otherwise corresponded to that of Example 5.

Example 7

This illustrates the continuous purification of a light crude benzine.

Density at 15° C.=0.771

|  | °C. |
|---|---|
| Commencement of boiling | 35 |
| 57 vol. per cent up to | 100 |
| 75 vol. per cent up to | 120 |
| 96.5 vol. per cent up to | 158 |

Gum test (copper dish): 28 mg/100 ccm.

The crude benzine was preheated to 150–180° C. at a pressure of 0.5 atm. above atmospheric pressure and, released from pressure, led through bleaching earth impregnated with cresol (10% by weight). In the purifying vessel behind this layer a layer of bleaching earth which had not been impregnated was placed, which likewise was traversed by the vapours. The purifying vessel was heated with superheated steam of 130–160° C.

Refined product: Density at 15°=0.711

|  | °C. |
|---|---|
| Commencement of boiling | 36 |
| 59 vol. per cent up to | 100 |
| 78 vol. per cent up to | 120 |
| 96.5 vol. per cent up to | 157 |

Gum test: 2 mg./100 ccm.
Refined product: Cresol-free.

Example 8

This example illustrates the discontinuous purification of crude benzole.

Analysis of the unpurified product: Density at 15°=0.878

|  | °C. |
|---|---|
| Commencement of boiling | 80 |
| 76 vol. per cent up to | 100 |
| 83 vol. per cent up to | 120 |
| 95 vol. per cent up to | 160 |

Pretreated with diluted $H_2SO_4$ (30%) and diluted NaOH (10%).

Resin former test: 64 mg./100 ccm.

From the still, first the fraction boiling up to 120° C. was distilled through liquid carbolic acid. The constituents boiling from 120° were led with a carrier gas through xylenol applied to low temperature distillation coke. 98.1% purified product, referred to the crude product, were obtained.

Analysis of the purified product: Density at 15° C.=0.878

|  | °C. |
|---|---|
| Commencement of boiling | 81 |
| 76 vol. per cent up to | 100 |
| 85 vol. per cent up to | 120 |
| 95 vol. per cent up to | 156 |

Resin former test: 4.5 mg./100 ccm.
Purified product: Xylenol-free.

Example 9

This example illustrates the continuous purification of crude benzole.

Analysis of the unpurified benzole: Density at 15°=0.880

|  | °C. |
|---|---|
| Commencement of boiling | 80 |
| 75 vol. per cent up to | 100 |
| 86 vol. per cent up to | 120 |
| 91 vol. per cent up to | 140 |
| 95 vol. per cent up to | 163 |

Resin former test: 60 mg./100 ccm.

This crude benzole was first freed from pyridine bases, and after release from pressure distilled at about 180° over a wood charcoal activated with cresol (10% cresol).

Analysis of the end product:

|  | °C. |
|---|---|
| Commencement of boiling | 80 |
| 78 vol. per cent up to | 100 |
| 89 vol. per cent up to | 120 |
| 93 vol. per cent up to | 140 |
| 95 vol. per cent up to | 156 |

Resin former test: 7 mg./100 ccm.

The distillate, of water-clear colour and aromatic odour, was free from cresol. The resin former test yielded 7 mg./100 ccm.

I claim:

1. A process for purifying crude hydrocarbons consisting in passing the crude hydrocarbon in vapour form through heated liquid purifying agent, said purifying agent comprising at least one substance selected from the group consisting of phenols and homologues of phenols, and the temperature of the purifying agent being maintained above the boiling and vaporization temperature of the crude hydrocarbon.

2. A process for purifying crude hydrocarbons consisting in passing the crude hydrocarbon in vapour form through heated liquid purifying agent absorbed on a porous body, said purifying agent comprising at least one substance selected from the group consisting of phenols and homologues of phenols, and the temperature of the purifying agent being maintained above the boiling and vaporization temperature of the crude hydrocarbon.

3. A process for purifying crude liquid hydrocarbons, consisting in heating the crude liquid hydrocarbon under pressure, reducing said pressure in order to convert the liquid hydrocarbon as a whole into vapour form and passing the hydrocarbon vapour through heated liquid purifying agent, said purifying agent comprising at least one substance selected from the group consisting of phenols and homologues of phenols, and the temperature of the purifying agent being maintained above the boiling and vaporization temperature of the crude hydrocarbon.

4. A process for purifying crude liquid hydrocarbons, consisting in distilling the crude hydrocarbon and passing the vapour fractions from the distillation through heated liquid purifying agent, said purifying agent comprising at least one substance selected from the group consisting of phenols and homologues of phenols, and the temperature of the purifying agent being maintained above the boiling and vaporization temperature of the fractions passing therethrough.

5. A process as claimed in claim 2 in which the purifying agent is mixed with a low boiling hydrocarbon diluent.

6. A process as claimed in claim 1 in which the vapours leaving the purifying agent are passed through bleaching earth.

7. A process as claimed in claim 1 for purifying crude hydrocarbons rich in high-boiling hydrocarbons, consisting in converting the crude hydrocarbons into vapour phase with the aid of a low boiling hydrocarbon as carrier, and then passing the vapour through the heated purifying agent.

KARL SÜSSELBECK.